H. H. HUNTLEY.
HUB BAND AND COÖPERATING WRENCH.
APPLICATION FILED OCT. 27, 1913.
1,094,905.
Patented Apr. 28, 1914.
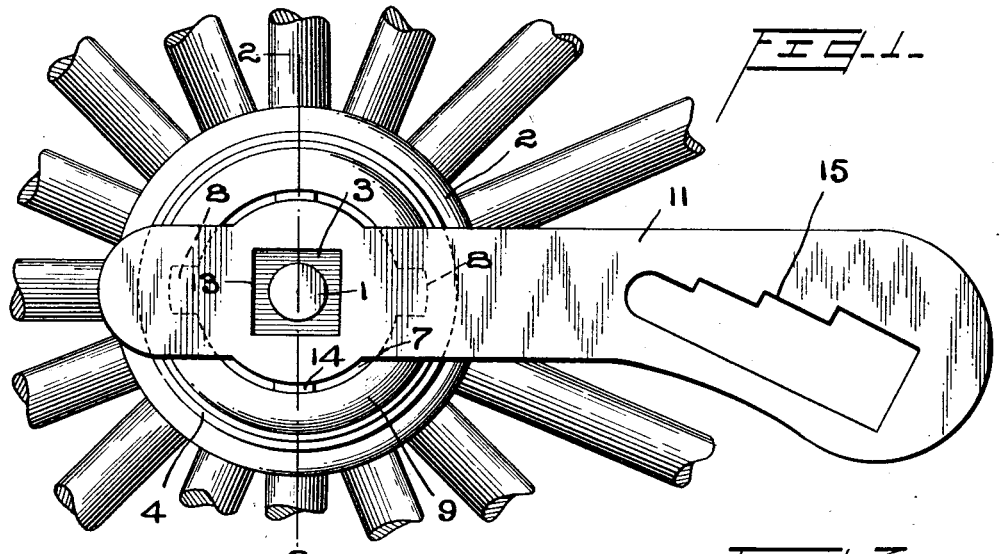
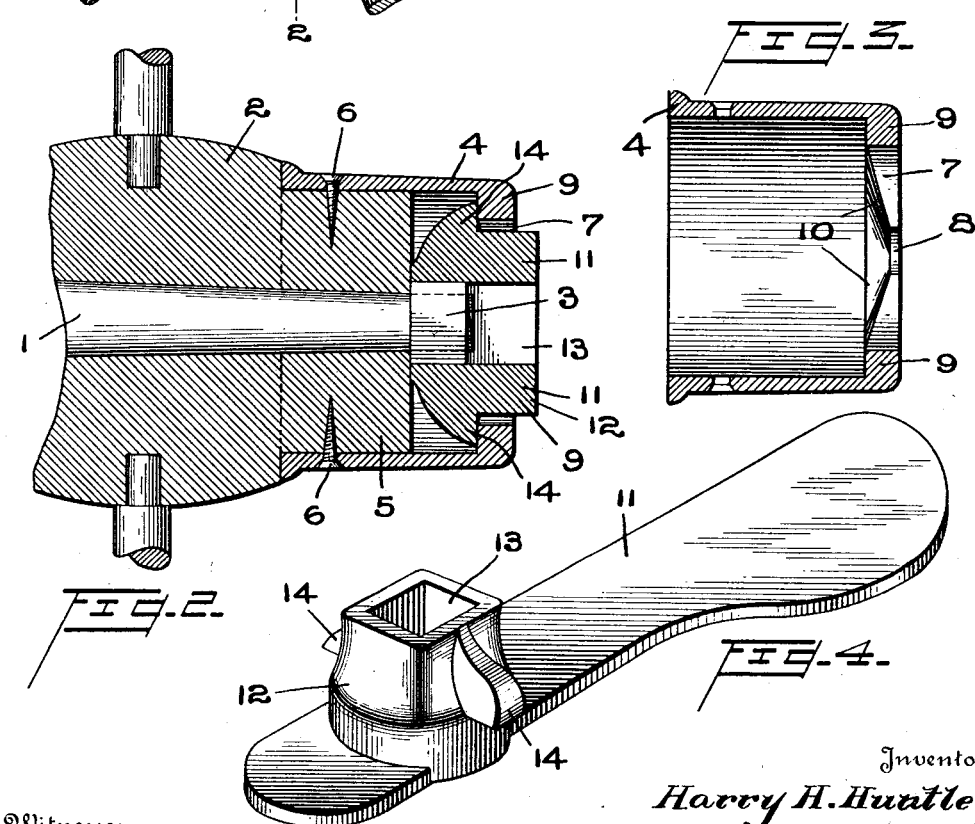
Witnesses
Inventor
Harry H. Huntley
By Joshua R. H. Potts
Attorney

UNITED STATES PATENT OFFICE.

HARRY H. HUNTLEY, OF MILLVILLE, NEW JERSEY, ASSIGNOR OF ONE-HALF TO EDWARD H. SITHENS, OF MILLVILLE, NEW JERSEY.

HUB-BAND AND COÖPERATING WRENCH.

1,094,905. Specification of Letters Patent. Patented Apr. 28, 1914.

Application filed October 27, 1913. Serial No. 797,483.

*To all whom it may concern:*

Be it known that I, HARRY H. HUNTLEY, a citizen of the United States, residing at Millville, in the county of Cumberland and State of New Jersey, have invented certain new and useful Improvements in Hub-Bands and Coöperating Wrenches, of which the following is a specification.

My invention relates to improvements in hub bands and coöperating wrenches, the object of the invention being to provide an improved construction of hub band with an improved construction of wrench, which when properly positioned in the hub band, will grip the nut, and permit the nut to be removed when the wheel is turned, holding the nut in proper position while the axle is greased, and the hub returned to normal position on the axle.

A further object is to provide an improved construction of wrench which is adapted to be wedged within a hub band, and securely hold a nut while the latter is turned.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in section on the line 2—2 of Fig. 1. Fig. 3 is a view in section of the hub band removed, and Fig. 4 is a view of a slightly modified form of wrench.

1 represents an axle and 2 a wheel hub mounted to turn thereon, and secured in place by the ordinary nut 3.

4 represents my improved hub band which is secured on the recessed outer end 5 of hub 2 by means of screws 6. The band 4 projects out beyond the end of the hub and is provided in its outer end 9 with a relatively large opening 7, and the opposite walls of the opening 7 are provided with recesses 8. The inner face of the end 9 is beveled or inclined in opposite directions from the recesses 8, as shown at 10. In other words, the end 9 is thinnest at the recesses 8, and gradually thickens or widens from said recesses to an intermediate point between them, so that the beveled surfaces 10 constitute cams for a purpose which will hereinafter appear.

11 represents my improved wrench which is provided on one face with an enlargement 12 having an angular opening 13 therein of a size to fit the nut 3. At opposite sides of the enlargement 12, lugs 14 are formed, and these lugs 14 are adapted to be moved through the recesses 8 when the enlargement 12 is moved through the opening 7 in the hub band.

In operation, the nut is positioned in the opening 13 when the enlargement 12 is moved through the opening 7 as above set forth. When the parts are in this position, if the wrench is given a partial rotary movement, the lugs 14 will move against the cam surfaces 10, and securely bind the enlargement between the outer end 9 of band 4, and the outer end 5 of hub 2, so that the wrench will be securely clamped against movement while it holds the nut 3. When the parts are in this position, the wheel may be turned and cause the nut to be unscrewed, hence the turning movement of the wheel may entirely unscrew the nut and allow the wheel to be removed from the axle. The axle may then be greased and the wheel returned, the nut still remaining in its clamped position, so that it will be in position to screw onto the axle, the wrench being thrown around to bring its lugs into engagement with the opposite cam surfaces.

In Fig. 1, I show the wrench as having an irregular shaped opening 15 to accommodate various sizes of nuts, and I also extend the opening 13 entirely through the wrench. In Fig. 4 the openings 15 are dispensed with and the outer end of the opening 13 is closed, and I would have it understood that I may make the wrench either way.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described by invention, what I claim as new and desire to secure by Letters Patent is:

1. The combination with a wheel hub and a band secured thereon, said band at one end projecting beyond the wheel hub and having an opening therein, of a wrench having a nut receiving extension thereon, said extension adapted to be projected through the opening in the band, said extension having lugs at opposite sides, and said band having recesses in its end through which the lugs are moved and said band on the inner face of its end having cam surfaces against which the lugs engage when the extension is given a partial rotary movement to bind the extension against the end of the hub in position to receive the nut, substantially as described.

2. The combination with a wheel hub, of a band secured on one end of the hub and projecting beyond the hub, said band having an opening in its end, and recesses in opposite walls of the opening, of a wrench having a nut receiving extension thereon adapted to be positioned through the opening in the band, said extension having lugs at opposite sides adapted to be moved through the recesses in the band, and said band at its outer end on its inner face having cam surfaces against which the lugs are moved when the wrench is given a partial turning movement, substantially as described.

In testimony whereof I have signed my name to this specification in the presence of two subscribing witnesses.

HARRY H. HUNTLEY.

Witnesses:
 JARVIS G. MILLER,
 ROLAND B. CORSON.

---

Copies of this patent may be obtained for five cents each, by addressing the "Commissioner of Patents, Washington, D. C."